(12) United States Patent
Thaemlitz et al.

(10) Patent No.: US 7,238,646 B2
(45) Date of Patent: *Jul. 3, 2007

(54) INVERTIBLE WELL BORE SERVICING FLUID

(75) Inventors: Carl J. Thaemlitz, Katy, TX (US); Robert S. Taylor, Red Deer (CA); Ryan M. Foster, Houston, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 11/283,009

(22) Filed: Nov. 18, 2005

(65) Prior Publication Data

US 2006/0079407 A1 Apr. 13, 2006

Related U.S. Application Data

(63) Continuation of application No. 10/350,415, filed on Jan. 24, 2003, now Pat. No. 6,989,354.

(51) Int. Cl.
*C09K 8/36* (2006.01)
*C09K 8/82* (2006.01)

(52) U.S. Cl. ............ 507/131; 507/129; 507/128; 507/133; 507/237; 507/238; 507/244; 507/246; 516/27

(58) Field of Classification Search .......... 507/131, 507/129, 128, 133, 237, 238, 244, 246; 516/27
See application file for complete search history.

(56) References Cited

U.S. PATENT DOCUMENTS

| | | | |
|---|---|---|---|
| 2,510,284 A | 6/1950 | Haggard | |
| 3,125,517 A | 3/1964 | Voda | |
| 4,230,586 A | 10/1980 | Bretz et al. | |
| 4,663,076 A | 5/1987 | Clapper et al. | |
| 4,713,183 A | 12/1987 | Patel et al. | |
| 4,816,551 A | 3/1989 | Oehler et al. | |
| 5,254,531 A | 10/1993 | Mueller et al. | |
| 5,888,944 A | 3/1999 | Patel | |
| 6,218,342 B1 | 4/2001 | Patel | |
| 6,608,006 B2 | 8/2003 | Taylor et al. | |
| 6,790,811 B2 | 9/2004 | Patel | |
| 6,806,233 B2 | 10/2004 | Patel | |
| 6,989,354 B2* | 1/2006 | Thaemlitz et al. | 507/131 |
| 2001/0051593 A1 | 12/2001 | Patel | |
| 2002/0033258 A1 | 3/2002 | Patel | |
| 2003/0054961 A1 | 3/2003 | Taylor et al. | |
| 2003/0228985 A1 | 12/2003 | Taylor et al. | |
| 2004/0023817 A1 | 2/2004 | Taylor et al. | |

FOREIGN PATENT DOCUMENTS

| | | |
|---|---|---|
| EP | 0 878 606 B1 | 7/2002 |
| EP | 1 234 948 A1 | 8/2002 |
| EP | 1 236 863 A1 | 9/2002 |
| EP | 1 293 550 A2 | 3/2003 |

OTHER PUBLICATIONS

Foreign communication from a related counterpart application dated May 26, 2004.
Office Action dated Feb. 28, 2005 for U.S. Appl. No. 10/350,415.

* cited by examiner

*Primary Examiner*—Philip C. Tucker
(74) *Attorney, Agent, or Firm*—Craig W. Roddy; Conley Rose

(57) ABSTRACT

A method for using an invert emulsion fluid in a well bore, comprising placing an invert emulsion fluid in a well bore, wherein the invert emulsion fluid comprises an oleaginous fluid, a non-oleaginous fluid and an emulsifier comprising one or more amines generally represented by the formula:

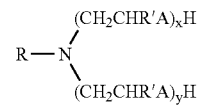

wherein R is a radical selected from the group consisting of abietyl, hydroabietyl, dihydroabietyl, tetrahydroabietyl, and dehydroabietyl, each R' may be the same or different and is an alkyl having from about 1 to about 3 carbons, each A may be the same or different and is NH or O, and the sum of x and y ranges from about 1 to about 20, and contacting the invert emulsion fluid with an acid solution to reversibly convert the invert emulsion to an oil-in-water emulsion.

20 Claims, No Drawings

INVERTIBLE WELL BORE SERVICING FLUID

CROSS-REFERENCE TO RELATED APPLICATIONS

This is a continuation application of U.S. patent application Ser. No. 10/350,415, filed Jan. 24, 2003, now U.S. Pat. No. 6,989,354 and entitled "Invertible Well Bore Servicing Fluid," which is hereby incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention generally relates to well bore servicing fluids. More specifically, the invention relates to an invertible well bore servicing fluid containing an amine emulsifier that allows the fluid to be reversibly converted from a water-in-oil emulsion to an oil-in-water emulsion upon contact with an acid.

BACKGROUND OF THE INVENTION

Well cementing is a process used in penetrating subterranean formations that produce oil and gas. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement in water is placed in the annulus and permitted to set into a hard mass to thereby attach the string of pipe to the walls of the well bore and seal the annulus. By sealing the annulus, migration of reservoir fluids from one zone to another through the annulus is prevented.

Various types of drilling fluids, also known as drilling muds, have been employed in the well cementing process. Oil-based drilling fluids have several advantages compared to water-based drilling fluids such as superior hole stability, especially in shale formations, and excellent lubrication properties. These lubrication properties permit the drilling of well bores having a significant vertical deviation, as is typical of off shore or deep water drilling operations. When a water-based drilling fluid is used to drill a highly deviated well bore, the torque and drag on the casing can undesirably cause the casing that lies against the low side of the well bore to stick. In contrast, oil-based fluids form a thin, slick filter cake that helps prevent the casing from sticking.

Oil-based drilling fluids typically contain some water, making them water-in-oil type emulsions, also known as invert emulsions. The water may arise in the drilling fluid itself or from the well bore, or it may be intentionally added to affect the properties of the drilling fluid. The invert emulsion commonly contains both water-soluble and oil-soluble emulsifiers (i.e., emulsifying agents or surfactants) to stabilize the invert emulsion. Examples of traditional emulsifiers employed in the invert emulsion include polyvalent metal soaps, phosphate esters, fatty acids, and fatty acid soaps. Typically, these emulsifiers impart oil wetting properties to the drilling fluids.

The use of traditional emulsifiers in drilling fluids can complicate the clean up process in open hole completion operations. In particular, oil-based solvents containing surfactants are used to penetrate the filter cake and reverse the wetability of the filter cake particles, thereby converting the oil-wet solids of the filter cake to water-wet solids. Water-wet solids in the filter cake are required so that a subsequent acid wash can be used to destroy or remove the particles. Acid usually cannot be placed in direct contact with a traditional invert emulsion. Otherwise, the direct acid contact would lead to the addition of the acid to the invert emulsion's internal aqueous phase, resulting in a significant increase in the viscosity of the invert emulsion. Cleaning the well bore in this staged manner can be time consuming. Unfortunately, the longer the time required to clean the well bore, the more likely the well bore is to become unstable and collapse. If this occurs, the well bore will have to be re-drilled or opened up before production can occur. Thus, there is a tradeoff between increased production due to a fully cleaned-up well bore and the potential of collapse of the well bore due to instability.

To avoid risking the collapse of the well bore, drilling fluids containing, for example, ethoxylated soya amine emulsifiers, have been developed that provide for a faster clean up of the well bore. Such drilling fluids can be reversibly converted from a water-in-oil type emulsion (i.e., invert emulsion) to an oil-in-water type emulsion that can be easily broken down with an acid soak solution. The invert emulsion is converted to an oil-in-water emulsion by mixing it with an aqueous acid solution that protonates the emulsion. If the subterranean formation produces crude oil, the aqueous acid solution commonly contains a strongly anionic sulfonate surfactant to prevent the formation of aqueous acid solution-crude oil emulsions in the well bore and crude oil sludging therein. However, it has been discovered that due to the presence of the anionic sulfonate surfactant, the emulsifier becomes water insoluble such that the emulsion remains as a water-in-oil emulsion. Further, the aqueous acid solution adds to the internal water phase, resulting in a significant increase in the viscosity of the invert emulsion. The high viscosity emulsion can undesirably seal off the subterranean formation, irreversibly damaging the formation and making oil production impossible.

As such, there continues to be a need for oil-based fluids with improved acid additive compatibility that can be quickly and easily converted from invert emulsions to oil-in-water emulsions without being concerned their viscosity might increase. Using such oil-based fluids would ensure that the subterranean formation penetrated by the well bore does not become plugged. The present invention utilizes an oil-based fluid that may be inverted in a timely manner without risking damage to the formation and that is compatible with typical sulfonate acidizing additives.

SUMMARY OF THE INVENTION

Disclosed herein is a method for using an invert emulsion fluid in a well bore, comprising placing an invert emulsion fluid in a well bore, wherein the invert emulsion fluid comprises an oleaginous fluid, a non-oleaginous fluid and an emulsifier comprising one or more amines generally represented by the formula:

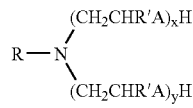

wherein R is a radical selected from the group consisting of abietyl, hydroabietyl, dihydroabietyl, tetrahydroabietyl, and dehydroabietyl, each R' may be the same or different and is an alkyl having from about 1 to about 3 carbons, each A may be the same or different and is NH or O, and the sum of x and y ranges from about 1 to about 20, and contacting the invert emulsion fluid with an acid solution to reversibly convert the invert emulsion to an oil-in-water emulsion.

Further disclosed herein is a method for using an invert emulsion fluid in a well bore, comprising placing an invert emulsion fluid in a well bore, wherein the invert emulsion fluid comprises an oleaginous fluid, a non-oleaginous fluid, and an emulsifier comprising one or more amines generally represented by the formula:

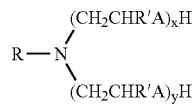

R is a radical selected from the group consisting of abietyl, hydroabietyl, dihydroabietyl, tetrahydroabietyl, and dehydroabietyl, each R' may be the same or different and is an alkyl having from about 1 to about 3 carbons, each A may be the same or different and is NH or O, and the sum of x and y ranges from about 1 to about 20, and contacting the invert emulsion fluid with an acid solution to reversibly convert the invert emulsion to an oil-in-water emulsion, wherein the invert emulsion fluid further comprises a gelling agent comprising a ferric iron or aluminum polyvalent metal salt of a phosphonic acid ester, the phosphonic acid ester being generally represented by the formula:

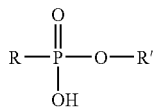

wherein R is an alkyl group having from about 8 to about 24 carbon atoms and R' is an alkyl group having from about 1 to about 4 carbon atoms, a proppant material, and an effective amount of a delayed gel breaker to break a gel formed by the gelling agent and the oleaginous fluid.

DETAILED DESCRIPTION OF THE
PREFERRED EMBODIMENTS

According to the present invention, an invert emulsion fluid for use in a well bore can be readily and reversibly converted to an oil-in-water emulsion by increasing the hydrogen ion concentration of the fluid. The hydrogen ion concentration may be increased by contacting the fluid with an effective amount of an acid to cause its conversion. One or more amine emulsifiers present in the fluid are protonated by the hydrogen ions. The resulting protonated amine has a cationic charge that increases its water and acid solubility. As a result, the fluid now favors a water external emulsion state. In addition, the fluid can be converted from an oil-in-water emulsion back to an invert emulsion by contacting the fluid with an effective amount of a base for deprotonation of the amine emulsifiers. Examples of suitable bases are those that would increase the hydroxyl ion concentration of the fluid, e.g., hydroxides, including those of sodium (caustic soda), calcium (lime or slaked lime), potassium (caustic potash), and magnesium.

The invert emulsion fluid includes an oleaginous fluid, a non-oleaginous fluid, and an emulsifier comprising one or more amines generally represented by the formula:

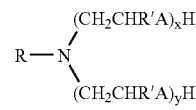

wherein R is a cycloaliphatic hydrocarbon, each R' may be the same or different and is H or an alkyl having from about 1 to about 3 carbon atoms, each A may be the same or different and is NH or O, and the sum of x and y ranges from about 1 to about 20. In a preferred embodiment, R is a radical selected from the group consisting of abietyl, hydroabietyl, dihydroabietyl, tetrahydroabietyl, and dehydroabietyl, R' is H, and A is O. In other preferred embodiments, the one or more amines are ethoxylated rosin amines. The term "rosin amine" is defined as the primary amines derived from various rosins or rosin acids, whereby the carboxyl of the rosin or rosin acid is converted to an amino ($-NH_2$) group. Examples of suitable rosin amines include: gum and wood rosin amines primarily containing abietyl; rosin amine derived from hydrogenated gum or wood rosin and primarily containing dehydroabietylamine, rosin amine derived from hydrogenated gum or wood rosin and primarily containing dihydro- and tetrahydroabietylamine; heat treated rosin amine derived from heat treated rosin; polymerized rosin amine derived from polymerized rosin; isomerized rosin amine derived from isomerized rosin and containing substantial amounts of abietylamine; and the rosin amines derived from pure rosin acids, e.g., abietylamine, dihydroabietylamine, dehydroabietylamine, and tetrahydroabietylamine.

As used in this specification, the abietyl, hydroabietyl, and dehydroabietyl amine radicals are referred to with the intention that they be considered broadly as covering rosin materials containing those radicals as major constitutents. As such, the products derived from rosin are considered to have the abietyl radical as the major constituent, the products derived from hydrogenated rosin are considered to have the hydroabietyl radicals as the major constituent and dehydrogenated rosin is considered to have dehydroabietyl as the major constituent. It is to be understood, however, that a specific rosin amine may include minor amounts of each of the various rosin amines.

A detailed description of the preparation of ethoxylated rosin amines is presented in U.S. Pat. No. 2,510,284, which is incorporated by reference herein in its entirety. The preparation of ethoxylated rosin amines involves first producing either monoethanol rosin amine or diethanol rosin amine in the absence of a catalyst. The ethanol rosin amines are thereafter further reacted with ethylene oxide to increase the ethylene oxide content of the ethoxylated rosin amines.

In more preferred embodiments, the invert emulsion fluid contains an emulsifier that comprises from about 0 to about 25 weight (wt.) % non-ethoxylated Rosin Amine D (RAD) and from about 75 to about 100 wt. % ethoxylated RAD, based on the total weight of the invert emulsion fluid. As used throughout the specification, the symbol "%" represents the term "percent." Rosin Amine D contains a mixture of primary amines derived from modified rosin, with its major constituent being dehydroabietyl amine, which has a condensed ring structure bonded to one nitrogen atom. RAD may be alkoxylated via ethoxylation on the nitrogen atom by reacting it with, e.g., from about 1 to about 11 moles of ethylene oxide, preferably from about 2 to about 6 moles of ethylene oxide. Examples of suitable commercially available RAD include the POLYRAD products, which are commercially available from Hercules Inc. under various tradenames, e.g., POLYRAD 0500™, POLYRAD 0515™, POLYRAD 1100™, and POLYRAD 1110™. By way of example, POLYRAD 1110™ is composed of 90 wt. % RAD ethoxylated with 11 moles of ethylene oxide and 10 wt. % non-ethoxylated RAD. Examples of other suitable commercially available ethoxylated rosin amines include the Witco RAD products, such as Witco RAD 515 and Witco RAD 1100, which may be purchased from Akzo Nobel Inc.

Any known oleaginous fluid may be used to form the external oil phase of the invert emulsion fluid. The oleaginous fluid preferably comprises any petroleum oil, natural oil, synthetically derived oil, or combinations thereof. More preferably, the oleaginous fluid comprises at least one of an alpha olefin, an internal olefin, an ester, a diester of carbonic acid, a paraffin, kerosene oil, diesel oil, and mineral oil. In addition, any known non-oleaginous fluid may be used to form the internal phase of the invert emulsion fluid. The non-oleaginous fluid is preferably an aqueous fluid, more preferably tap or fresh water; sea water; naturally-occurring brine; a chloride-based, bromide-based, or formate-based brine containing monovalent and/or polyvalent cations; or combinations thereof. Examples of chloride-based brines include sodium chloride and calcium chloride. Examples of bromide-based brines include sodium bromide, calcium bromide, and zinc bromide. Examples of formate-based brines include sodium formate, potassium formate, and cesium formate.

The invert emulsion fluid is a well bore servicing fluid, i.e., a fluid used to drill, complete, work over, or in any way service a well bore. For example, the invert emulsion fluid may serve as a drilling fluid, a completion fluid, a work-over fluid, a gravel packing fluid, a formation fracturing fluid, a stimulating fluid, or a packer fluid. Other types of fluids for which the invert emulsion fluid may be used would be apparent to one skilled in the art. The concentration of each component in the invert emulsion fluid depends upon the intended use of the invert emulsion fluid.

If the intended use of the invert emulsion fluid is as a gravel packing fluid, a completion fluid, or a work-over fluid, the amount of emulsifier present in the fluid preferably ranges from about 0.1 volume (vol.) % to about 10 vol. % based on the total volume of the fluid, more preferably from about 0.5 vol. % to about 5.0 vol. %, and most preferably from about 0.8 vol. % to about 4 vol. %. The emulsifier in the invert emulsion fluid preferably contains a 75:25 wt. % ratio of the ethoxylated Rosin Amine D relative to the non-ethoxylated Rosin Amine D, more preferably a 85:15 wt. % ratio, and most preferably a 98:2 wt. % ratio. Further, the amount of oleaginous fluid present in the invert emulsion fluid preferably ranges from about 15 vol. % to about 85 vol. % based on the volume of the liquid fraction of the invert emulsion fluid, more preferably from about 30 vol. % to about 70 vol. %, and most preferably from about 40 vol. % to about 60 vol. %. In addition, the amount of non-oleaginous fluid present in the invert emulsion fluid preferably ranges from about 85 vol. % to about 15 vol. % based on the volume of the liquid fraction of the invert emulsion fluid, more preferably from about 70 vol. % to about 30 vol. %, and most preferably from about 60 vol. % to about 40 vol. %.

If the intended use of the invert emulsion fluid is as a drilling fluid, the amount of emulsifier present in the fluid preferably ranges from about 0.2 vol. % to about 8.0 vol. %. based on the total volume of the fluid, more preferably from about 0.5 vol. % to about 5.0 vol. %, and most preferably from about 0.1 vol. % to about 4.0 vol. %. The emulsifier in the invert emulsion fluid preferably contains a 75:25 wt. % ratio of the ethoxylated Rosin Amine D relative to the non-ethoxylated Rosin Amine D, more preferably a 85:15 wt. % ratio, and most preferably a 98:2 wt. % ratio. Further, the amount of oleaginous fluid present in the invert emulsion fluid preferably ranges from about 1 vol. % to about 50 vol. % based on the volume of the invert emulsion fluid, more preferably from about 2 vol. % to about 50 vol. %, and most preferably from about 5 vol. % to about 45 vol. %. In addition, the amount of non-oleaginous fluid present in the invert emulsion fluid preferably ranges from about 50 vol. % to about 1 vol. % based on the volume of the invert emulsion fluid, more preferably from about 50 vol. % to about 2 vol. %, and most preferably from about 45 vol. % to about 5 vol. %.

The invert emulsion fluid of the present invention may also include one or more additional emulsifiers such as a polyaminated fatty acid, a diethanolamide of a fatty acid, an imidazoline, a phosphate ester, a phosphonate ester, a fatty acid, a dimer fatty acid, polymeric fatty acids, and combinations thereof. A suitable polyaminated fatty acid is commercially available from Halliburton Energy Services under the tradename LE SUPERMUL. A suitable diethanolamide of a fatty acid is commercially available from Akzo Nobel Inc. under the tradename Witcamide 511. The amount of additional emulsifier present in the invert emulsion fluid preferably ranges from about 0.0 vol. % to about 3 vol. % based on the total volume of the invert emulsion fluid, more preferably from about 0.1 vol. % to about 2 vol. %, and most preferably from about 0.2 vol. % to about 1 vol. %. The additional emulsifier improves the oil-wetting properties of the invert emulsion fluid.

The invert emulsion fluid may further include additional additives as deemed appropriate by one skilled in the art. It is preferred that any additional materials do not interfere with the reversibility of the fluid. For example, wetting agents, organophilic clays, viscosifiers, weighting agents, bridging agents, and fluid loss control agents may be added to the invert emulsion fluid to obtain certain properties.

The steps used to prepare the invert emulsion fluid for use in the well bore would be apparent to one skilled in the art. For example, a desired quantity of the oleaginous fluid may be mixed with a suitable amount of the amine emulsifier, followed by sequentially adding the remaining components with continuous mixing. The resulting mixture is then vigorously agitated while adding the oleaginous fluid. The emulsifer lowers the interfacial tension between the oleaginous fluid and the non-oleaginous fluid, enabling the non-oleaginous fluid to form a stable dispersion of fine droplets in the oleaginous fluid. Otherwise, the high interfacial tension between the oleaginous fluid and the non-oleaginous fluid would cause the two fluids to spontaneously separate when the agitation ceases.

The present invention also includes a method for using the previously described invert emulsion fluid in a well bore. The method comprises placing the invert emulsion fluid in a well bore and contacting the invert emulsion fluid with an acid solution to reversibly convert the invert emulsion to an oil-in-water emulsion. Before contacting the invert emulsion fluid with an acid solution, the invert emulsion fluid is employed to service the well bore as mentioned previously. The particular steps used to service the well bore depend upon the type of servicing performed and would be apparent to one skilled in the art. Furthermore, the oil-in-water emulsion may be converted back to an invert emulsion by contact with a base solution.

The acid solution comprises water and an acid, e.g., an inorganic acid such as hydrochloric acid, an organic acid such as acetic acid, formic acid, or glycolic acid, or combinations thereof. The strength of the acid solution should be sufficient to protonate the amine emulsifier. Preferably, about one molar equivalent of acid per one molar equivalent of the ethoxylated Rosin Amine D is added to the invert emulsion fluid. In preferred embodiments, the acid is hydrochloric acid that is present in the acid solution in an amount ranging from about 1 wt. % to about 36 wt. % based on the weight of the water, more preferably from about 10 wt. % to about 15 wt. %.

The acid solution may also contain an anionic sulfonate surfactant for preventing the formation of aqueous acid solution-crude oil emulsions and crude oil sludging. The anionic sulfonate surfactant may be selected from the group of linear or branched alkylbenzyl sulfonates such as linear or branched dodecylbenzenesulfonate or dodecylbenzenesulfonic acid, alkyl diphenyloxide disulfonates, and alpha-olefin sulfonates and sulfosuccinates. Of these, linear dodecylbenzenesulfonic acid is preferred. The anionic sulfonate surfactant is present in the aqueous acid solution in an amount preferably ranging from about 0.1 wt. % to about 1.5 wt. % based on the weight of the water, more preferably from about 0.4 wt. % to about 0.8 wt. %.

The base solution comprises water and a base, e.g., LiOH, NaOH, KOH, RbOH, Ca(OH)$_2$, Sr(OH)$_2$, Ba(OH)$_2$, or combinations thereof. The strength of the base solution should be sufficient to deprotonate the amine emulsifier, while the quantity of the base solution depends upon the amount of deprotonation that needs to be accomplished.

Well bore clean-up is much easier and quicker to carry out using the invert emulsion fluid of the present invention. A filter cake forms when the invert emulsion fluid comes into contact with a producing formation. Instead of washing the well bore with a detergent solution prior to acid washing, the use of the invert emulsion fluid allows the well bore to be washed using only the acid solution. The acid solution is injected into the well bore to protonate the amine surfactant, thereby converting the fluid on the filter cake from a water-in-oil emulsion to an oil-in-water emulsion. In particular, the addition of the acid solution causes the oleaginous fluid to change from the continuous phase to the discontinuous phase and the non-oleaginous fluid to change from the discontinuous phase to the continuous phase. The discontinuous phase, also known as the dispersed phase, forms a stable dispersion of fine droplets throughout the continuous phase. As a result of the conversion, the oil-wet particles of the filter cake become water-wet, allowing the acid to readily reach and dissolve the acid soluble particles in the filter cake. Thus, the well bore can be cleaned more effectively and rapidly using the invert emulsion fluid of the present invention as opposed to conventional well bore servicing fluids.

The invert emulsion fluid readily undergoes conversion from a water-in-oil emulsion to an oil-in-water emulsion despite the presence of the anionic sulfonate surfactant. The resulting oil-in-water emulsion has a relatively low viscosity. Thus, the oil-in-water emulsion is less likely to plug the subterranean formation and thus minimizes damage to the formation. When the fluid is to be used as a formation fracturing fluid, the fluid may further comprise a gelling agent. The gelling agent preferably includes a ferric iron or aluminum polyvalent metal salt of a phosphonic acid ester, a proppant material, and an effective amount of a delayed gel breaker to break a gel formed by the gelling agent and the oleaginous fluid. The phosphonic acid ester utilized in the gelling agent generally has the formula:

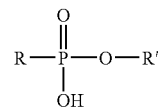

wherein R is an alkyl group having from about 8 to about 24 carbon atoms and R' is an alkyl group having from about 1 to about 4 carbon atoms. The phosphonic acid ester is preferably decane phosphonic acid mono methyl ester. The ferric iron or aluminum polyvalent metal salt of the phosphonic acid ester is present in the invert emulsion fluid in an amount ranging from about 0.1 wt. % to about 2.5 wt. % based on the weight of the oleaginous fluid, more preferably from about 0.2 wt. % to about 1 wt. %. The proppant material is present in the invert emulsion fluid in an amount ranging from about 1 to about 14 pounds of proppant material per gallon of oleaginous fluid. The delayed gel breaker, which is dissolved in the aqueous phase of the invert emulsion fluid, is present in the fluid in an amount ranging from about 0.01 wt. % to about 3 wt. % by weight of the oleaginous fluid, more preferably from about 0.05 wt. % to about 1 wt. %.

The invert emulsion fluid may be employed as a fracturing fluid by pumping it through a well bore into a subterranean formation to be stimulated. The fluid is pumped at a rate and pressure such that one or more fractures are formed and extended in the subterranean formation. The proppant material suspended in the fluid is deposited in the fractures when the gel is broken and returned to the surface. The proppant material remains in the fractures and functions to prevent the fractures from closing whereby conductive channels are formed through which produced fluids can readily flow from the subterranean formation into the well bore.

Proppant materials that may be used in the invert emulsion fluid are known in the art. Examples of poppant materials include graded sand, resin coated sand, sintered bauxite, various particulate ceramic materials, and glass beads. The particular size of the proppant material employed depends on the particular formation being fractured and other variables. Generally, the proppant particle sizes are in the range of from about 2 to about 200 mesh on the U.S. Sieve Series scale. The delayed gel breakers may be any suitable breaker for causing the gelled fluid to revert to a thin fluid after the fractures are formed in the subterranean formation. The gel breakers are preferably materials that are slowly soluble in water. The breaking of the gel does not take place until the gel breakers are dissolved in the water.

Examples of slowly soluble breakers are given in U.S. Pat. No. 5,846,915, which is incorporated by reference herein. A preferred gel breaker is hard burned magnesium oxide having a particle size that will pass through a 200 mesh Tyler screen. Hard burned magnesium oxide is commercially available from Clearwater Inc. of Pittsburgh, Pa. The hard burned magnesium oxide and other similar breakers are not immediately present for breaking the gel due to their slowly soluble nature. Other breakers such as alkali metal carbonates, alkali metal bicarbonates, alkali metal acetates, other alkaline earth metal oxides, alkali metal hydroxides, amines, and weak acids can be encapsulated with slowly water soluble or other similar encapsulating materials. Such encapsulating materials are known to those skilled in the art and function to delay the breaking of the gelled fluid for a required period of time. Examples of suitable encapsulating materials include precipitated silica, elastomers, polyvinylidene chloride (PVDC), nylon, waxes, polyurethanes, and cross-linked partially hydrolyzed acrylics. When an alkaline breaker, e.g., magnesium oxide, is utilized, the acid group of the phosphonic acid ester in the gelling agent is neutralized, resulting in an initial increase in the viscosity of the gelled hydrocarbon liquid after which the gel is broken.

Another type of breaker that can be utilized when the gelling agent is a ferric iron polyvalent metal salt of the phosphonic acid ester is a reducing agent that reduces ferric iron to ferrous iron. Ferric iron is capable of forming a viscous coordination complex with a phosphonic acid ester, and the complex can be disassociated by reducing the ferric iron to the ferrous state. The disassociation causes the gelled hydrocarbon liquid to break. Examples of suitable reducing agents include but are not limited to stannous chloride, thioglycolic acid (2-mercaptoacetic acid), hydrazine sulfate, sodium diethyldithiocarbamate, sodium dimethyldithiocarbamate, sodium hypophosphite, potassium iodide, hydroxylamine hydrochloride, thioglycol (2-mercaptoethanol), ascorbic acid, sodium thiosulfate, sodium dithionite, and sodium sulfite. Of these, the preferred reducing agents for use at a temperature of about 90° C. are stannous chloride, thioglycolic acid, hydrazine sulfate, sodium diethyldithiocarbamate, and sodium dimethyldithiocarbamate. The most preferred reducing agent is thioglycolic acid, which may be delayed by salt formation or encapsulation. The reducing agent may also be delayed by encapsulating it with a slowly water soluble or other similar encapsulating material.

In contrast to phosphoric acid esters utilized in conventional fracturing fluids, the phosphonic acid esters present in the invert emulsion fluid do not suffer from the problem that they decompose in refinery distillation towers to form volatile phosphorus which condenses on the trays of the distillation towers and cause plugging. In particular, the phosphonic acid esters of the present invention have much higher thermal stability and consequently do not as readily decompose or disassociate. Thus, their use minimizes the formation of volatile phosphorus in refinery distillation towers.

Additional disclosure related to the gelling agent described above can be found in patent application Ser. No. 09/792,165, entitled "Methods and Compositions for Treating Subterranean Formations with Gelled Hydrocarbon Fluids", which is incorporated by reference herein in its entirety.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

An invert emulsion fluid to be used as a completion fluid was prepared in accordance with the present invention. That is, 134 mL of HDF-2000 (i.e., mineral oil commercially available from Total Solvants) was combined with 12.6 mL of Witco RAD 515 (i.e., an amine emulsifier commercially available from Akzo Nobel Inc.) and stirred on a Hamilton Beach mixer. Then 210 mL of sodium bromide brine having a density of 12.3 lb/gal was added to the resulting solution while stirring. Next, 4 mL of Witcamide 511 (i.e., an emulsifier commercially available from Akzo Nobel Inc.) was added to the solution, followed by stirring the resulting mixture for about five minutes. The resulting fluid appeared as a white emulsion and had a density of about 10.1 lb/gal. Using a Fann electrical stability meter, i.e., a standard in the petroleum industry, the electrical stability of the fluid was found to be 80 volts at ambient temperature, which is indicative of the existence of a water-in-oil emulsion.

While stirring, the above fluid was treated with 15 wt. % hydrochloric acid (0.4 ml). Within seconds, the fluid appeared to convert to an oil-in-water emulsion. This conversion was confirmed by measuring the electrical stability of the fluid, which was 0.0 volts. The electrically conductive property of the fluid is proof that the fluid had been inverted and became water external.

The oil-in-water emulsion was then stirred while being treated with 36 wt. % sodium hydroxide solution (1.0 mL). Within a few seconds the oil-in-water emulsion converted back into a water-in-oil emulsion. After stirring for approximately five minutes, the electrical stability of the fluid was measured to be 20 volts at ambient temperature, indicating that the fluid had been converted back to a water-in-oil emulsion. The Theological properties of the resulting fluid were measured at 120° F. using the Fann 35A viscometer. The electrical stability at 120° F. was 21 volts, and the 600 rpm and 300 rpm Fann viscometer dial readings in degrees were 131 and 80, respectively.

Without further elaboration, it is believed that one skilled in the art can, using the description herein, utilize the present invention to its fullest extent. While preferred embodiments of the invention have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent that they provide exemplary, procedural or other details supplementary to those set forth herein.

What is claimed is:

1. A method for using an invert emulsion fluid in a well bore, comprising:
   (a) placing an invert emulsion fluid in a well bore, wherein the invert emulsion fluid comprises:
      (i) an oleaginous fluid;
      (ii) a non-oleaginous fluid; and
      (iii) an emulsifier comprising one or more amines generally represented by the formula:

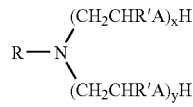

wherein R is a radical selected from the group consisting of abietyl, hydroabietyl, dihydroabietyl, tetrahydroabietyl, and dehydroabietyl, each R' may be the same or different and is an alkyl having from about 1 to about 3 carbons, each A may be the same or different and is NH or O, and the sum of x and y ranges from about 1 to about 20; and
   (b) contacting the invert emulsion fluid with an acid solution to reversibly convert the invert emulsion to an oil-in-water emulsion.

2. The method of claim 1 wherein the emulsifier comprises non-ethoxylated Drosin amine and from about 1 to about 12 molar equivalents of ethoxylated Drosin amine relative to the non-ethoxylated Drosin amine.

3. The method of claim 2 wherein the ethoxylated Drosin amine is formed by reacting Drosin amine with from about 5 to about 11 moles of ethylene oxide.

4. The method of claim 1 wherein the invert emulsion fluid is a well bore servicing fluid selected from a group consisting of a drilling fluid, a completion fluid, a work-over fluid, a gravel packing fluid, a formation fracturing fluid, and a stimulating fluid.

5. The method of claim 4 wherein an amount of emulsifier present in the gravel packing fluid, the completion fluid, and the work-over fluid ranges from about 0.1 volume % to about 10.0 volume % based on a total volume of the fluid.

6. The method of claim 4 wherein an amount of emulsifier present in the drilling fluid ranges from about 0.2 volume % to about 8.0 volume % based on a total volume of the fluid.

7. The method of claim 1 wherein the oleaginous fluid is selected from a group consisting of an alpha olefin, an internal olefin, an ester, a diester of carbonic acid, a paraffin, kerosene oil, diesel oil, mineral oil, and combinations thereof.

8. The method of claim 1 wherein the non-oleaginous fluid is selected from a group consisting of fresh water, sea water, naturally-occurring brine, a chloride-based brine, a bromide-based brine, a formate-based brine, and combinations thereof.

9. The method of claim 1 wherein the invert emulsion fluid further comprises an additional emulsifier.

10. The method of claim 9 wherein the additional emulsifier is selected from a group consisting of a polyaminated fatty acid, a diethanolamide of a fatty acid, a phosphate ester, a phosphonate ester, a fatty acid, a dimer fatty acid, polymeric fatty acids, and combinations with a base solution to reversibly convert the oil-in-water emulsion to an invert emulsion.

11. The method of claim 1 wherein the acid solution comprises an anionic sulfonate surfactant for preventing crude oil sludging.

12. The method of claim 1, further comprising contacting the oil-in-water emulsion with a base solution to reversibly convert the oil-in-water emulsion to an invert emulstion.

13. A method for using an invert emulsion fluid in a well bore, comprising:
   (a) placing an invert emulsion fluid in a well bore, wherein the invert emulsion fluid comprises:
      (i) an oleaginous fluid;
      (ii) a non-oleaginous fluid; and
      (iii) an emulsifier comprising one or more amines generally represented by the formula:

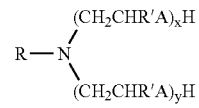

R is a radical selected from the group consisting of abietyl, hydroabietyl, dihydroabietyl, tetrahydroabietyl, and dehydroabietyl, each R' may be the same or different and is an alkyl having from about 1 to about 3 carbons, each A may be the same or different and is NH or 0, and the sum of x and y ranges from about 1 to about 20; and
   (b) contacting the invert emulsion fluid with an acid solution to reversibly convert the invert emulsion to an oil-in-water emulsion, wherein the invert emulsion fluid further comprises:
   a gelling agent comprising a ferric iron or aluminum polyvalent metal salt of a phosphonic acid ester, the phosphonic acid ester being generally represented by the formula:

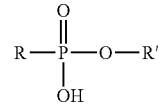

wherein R is an alkyl group having from about 8 to about 24 carbon atoms and R' is an alkyl group having from about 1 to about 4 carbon atoms;
   a proppant material; and
   an effective amount of a delayed gel breaker to break a gel formed by the gelling agent and the oleaginous fluid.

14. The method of claim 13 wherein the phosphonic acid ester is decane phosphonic acid mono methyl ester.

15. The method of claim 13 wherein the delayed gel breaker is selected from a group consisting of amines, weak acids, and alkaline earth metal oxides including magnesium oxide, alkali metal carbonates, alkali metal bicarbonates, alkali metal acetates, and alkali metal hydroxides.

16. The method of claim 13 wherein the polyvalent metal salt is ferric iron and the delayed gel breaker is a reducing agent that reduces ferric iron to ferrous iron.

17. The method of claim 16 wherein the reducing agent is selected from a group consisting of stannous chloride, thioglycolic acid and its salts, hydrazine sulfate, sodium diethyldithiocarbamate, sodium dimethyldithiocarbamate, sodium hypophosphite, hydroxylamine hydrochloride, thioglycol, ascorbic acid and its salts, sodium thiosulfate, and sodium sulfite.

18. The method of claim 13 wherein the emulsifier comprises non-ethoxylated Drosin amine and from about 1 to about 12 molar equivalents of ethoxylated Drosin amine relative to the non-ethoxylated Drosin amine.

19. The method of claim 13 wherein the invert emulsion fluid is a well bore servicing fluid selected from a group consisting of a drilling fluid, a completion fluid, a work-over fluid, a gravel packing fluid, a formation fracturing fluid, and a stimulating fluid.

20. The method of claim 13 wherein the oleaginous fluid is selected from a group consisting of an alpha olefin, an internal olefin, an ester, a diester of carbonic acid, a paraffin, kerosene oil, diesel oil, mineral oil, and combinations thereof.

* * * * *